United States Patent [19]

Petrie

[11] 4,425,698

[45] Jan. 17, 1984

[54] METHOD OF ASSEMBLING A PRESSURE VESSEL

[75] Inventor: Ivan L. Petrie, Waterloo, Iowa

[73] Assignee: Deere & Company, Moline, Ill.

[21] Appl. No.: 342,331

[22] Filed: Jan. 25, 1982

Related U.S. Application Data

[62] Division of Ser. No. 196,898, Oct. 14, 1980, Pat. No. 4,328,836.

[51] Int. Cl.³ .............................................. B23P 11/02

[52] U.S. Cl. .................................. 29/451; 29/157 R; 29/454; 228/256

[58] Field of Search ...................... 29/451, 157 R, 454; 138/30; 228/256

[56] References Cited

U.S. PATENT DOCUMENTS

| | | | |
|---|---|---|---|
| 3,256,911 | 6/1966 | Mercier et al. | 138/30 |
| 3,847,182 | 11/1974 | Greer | 138/30 |
| 3,907,000 | 9/1975 | Carr | 138/30 |
| 4,077,100 | 3/1978 | Zahid | 29/454 X |
| 4,162,692 | 7/1979 | Greer et al. | 138/30 |
| 4,177,836 | 12/1979 | Thompson | 138/30 |

*Primary Examiner*—Charlie T. Moon

[57] ABSTRACT

A inexpensive pressure vessel which can be disposed of rather than being repaired once it fails, which includes a cylindrical housing having two chambers separated by a resilient bladder. One chamber is for housing a gas while the second is for housing a fluid such as hydraulic oil. The cylindrical housing contains a port at one end and is open at the opposite end. The end cap which contains a through port and a gas valve is insertable into the open end of the cylindrical housing and is welded thereto. This weld joint in conjunction with a seal formed by attaching the resilient bladder to the end cap, will positively seal the pressure vessel. The unique seal between the end cap, bladder and housing is such that it will not be thermally damaged by the welding process which seals the end cap to the cylindrical housing.

4 Claims, 1 Drawing Figure

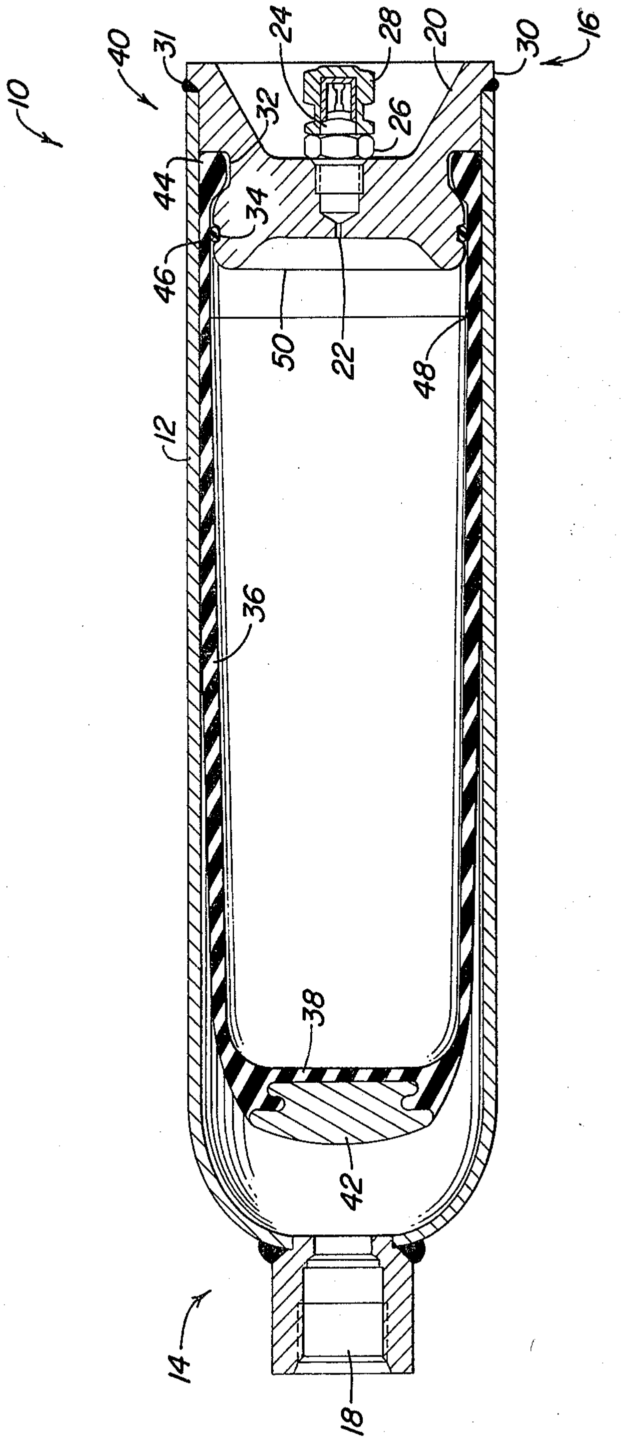
10
40
31
24
28
20
30
16
32
26
44
34
46
50
22
48
12
36
38
42
14
18

METHOD OF ASSEMBLING A PRESSURE VESSEL

This is a division of application Ser. No. 196,898, filed Oct. 14, 1980, now U.S. Pat. No. 4,328,836, issued May 11, 1982.

BACKGROUND OF THE INVENTION

1. Field of the Invention

This invention relates to a pressure vessel and more particularly to inexpensive pressure vessels which may be disposed of rather than repaired when they fail.

2. Description of the Prior Art

Pressure vessels refer to rigid vessels, some of which have an expandable inner chamber which is usually filled with a gas and an outer chamber which is subjected to the influx of hydraulic oil. The purpose of the dual chambers is to allow the incoming oil to be buffered to a certain extent before the oil is withdrawn for use within a hydraulic system. Normally such pressure vessels can be used in seat suspension systems and the like. In the past, disposable pressure vessels or accumulators as they are sometimes called, typically demanded a squeeze on the inner liner or bladder to seal the gas and the fluid of the pressure vessel from the atmosphere. In order to accomplish this sealing, threaded or row connections were used but proved to be very expensive. Pulsation in flexing forces in the bladder tended to generate leakage when the seal was dependent on squeeze. Although continuous bead welding provided an acceptable seal from the atmosphere, there did remain a difficult process of preventing thermal damage to the bladder during the manufacturing process.

One prior art patent which sought to overcome these deficiencies was U.S. Pat. No. 4,177,836 issued to Thompson on Dec. 11, 1979 and assigned to Deere & Co. The Thompson patent sought to seal the bladder to the pressure vessel without the need for a welded connection. Such a design proved to be beneficial but necessitated costly machining of certain components such as the cylindrical housing and the end cap. Now, a pressure vessel has been invented which combines the welded joint with a unique sealing arrangement for preventing internal damage to the bladder.

The general object of this invention is to provide a pressure vessel. A more specific object of this invention is to provide a disposable pressure vessel which may be disposed of rather than repaired when it fails.

Another object of this invention is to provide a pressure vessel which is inexpensive and easy to assemble.

Still another object of this invention is to provide a pressure vessel having a sealable joint in combination with a welded point wherein the sealed joint is not thermally effected by the welding process.

A further object of this invention is to provide a pressure vessel having a positive gas and fluid seal while reducing the manufacturing cost.

Other objects and advantages of the present invention will become more apparent when considered in connection with the following description and the drawing.

SUMMARY OF THE INVENTION

Briefly, this invention relates to an inexpensive pressure vessel having two inner chambers. One chamber is to contain a gas such as nitrogen, while the second chamber is to contain a fluid such as hydraulic oil. The pressure vessel comprises a cylindrical housing having a closed end and an open end. The closed end contains a port through which the fluid can enter one of the inner chambers. The open end of the cylindrical housing is encloseable by an insertable end cap which has an axially extending through hole disposed therein. Located within the through hole is a bidirectional gas valve through which gas may enter or exit the second inner chamber. Separating the two chambers is a resilient bladder which is sealably retained between the end cap and the cylindrical housing. The retention of the resilient bladder between the cylinder housing and the end cap is by the combination of an annular groove in the end cap into which is inserted an annular protuberant which is located on the inner periphery of the bladder. A second annular groove is also present in the outer periphery of the end cap and is designed to contain an O-ring which seals the end cap to the inner surface of the bladder. This internal sealing together with a continuous weld which seals the end cap to the cylindrical housing, provides a reliable yet inexpensive means for manufacturing a disposable pressure vessel.

BRIEF DESCRIPTION OF THE DRAWING

FIG. 1 is a cross-sectional view of a cylindrically shaped pressure vessel.

DETAILED DESCRIPTION OF THE PREFERRED EMBODIMENT

Referring to the drawing, a pressure vessel 10 or an accumulator as they are sometimes referred to, is shown having a cylindrical housing 12 preferably constructed of a rigid material. The cylindrical housing 12 has a closed end 14 and an open end 16. The closed end 14 contains a port 18 through which a fluid can enter or exit. The open end 16 is closed by an insertable end cap 20 which contains an axially extending through hole 22. Positioned within this through hole 22 is a valve means 24 such as a bidirectional gas valve. The valve means 24 is normally biased to a closed position to prevent the flow of pressurized gas therethrough and is openable to allow the passage of the pressurized gas in either direction through the hole 22. The valve means 24 further has a retaining nut 26 by which it is held secure to the end cap 20 and a protective cover 28 which provides a positive seal of the valve means 24 from the atmosphere. The entire valve means 24 is totally disposed within the confines of the end cap 20.

The end cap 20 contains an annular shoulder 30 positioned on the outer periphery which will abut against the open end 16. The annular shoulder 30 is welded by weld 31 to the cylindrical housing 12 when the end cap 20 is fully inserted into the cylindrical housing 12 as shown. In addition, first and second annular grooves 32 and 34 respectively, are provided on the outer periphery of the end cap 20. The first annular groove 32 provides a mating surface for a generally cylindrical bladder 36 while the second annular groove 34 houses a sealing means 46. The bladder 36, which is preferably constructed of a flexible resilient material such as rubber, has a closed end 38 and an open end 40. Within the closed end 38 is an extrusion preventer 42 which prevents extrusion of the bladder 36 through the port 18 when the pressure within the bladder 36 is greater than the pressure in the port 18. The open end of the bladder 36 contains an annular protuberant 44 which mates with the first annular groove 32. This annular protuberants 44 is located on the inner surface of the bladder 36 at the open end 40 and preferably is located at the extreme end of the bladder 36.

Positioned in the second annular groove 34 is the sealing means 46 such as an O-ring, which creates a seal between the outer periphery of the end cap 20 and the inner surface of the bladder 36. The combination of the annular protuberant 44 and the sealing means 46 is such that when the end cap 20 is fully inserted into the cylindrical housing 12, so that the annular shoulder 30 abuts the open end 16, the annular protuberant 44 will be compressed into the first annular groove 32. This compression of the annular protuberant 44 insures a tight seal between the outer surface of the bladder 36 and the inner surface of the cylindrical housing 12. This in combination with the sealing means 36 will insure that none of the gas contained within the bladder 36 will mix with the oil which is present in the outer chamber formed by the bladder 36 and the cylindrical housing 12. In addition, the seals formed by the annular protuberant 44 and the sealing means 46 will not be thermally damaged by the continuous welding process which joins the end cap 20 to the cylindrical housing 12.

The bladder 36 also contains a slight taper which is inclined towards the closed end 38. This slight taper originates at a point 48 which is near the inner surface 50 of the end cap 20. This slight taper which can be approximately half a degree or greater provides for an even expansion of the bladder 36 against the inner surface of the cylindrical housing 12 as pressurized gas is conveyed into the inner confines of the resilient bladder 36.

OPERATION

In operation, the pressure vessel 10 is normally connected by a hydraulic line via port 18 to a hydraulic system, for example, a seat suspension system. A gas line is then connected to the valve means 24 and the inner chamber defined by the confines of the bladder 36 is precharged with a gas to a predetermined value such as 90 psi. The seat suspension system, which utilizes a hydraulic fluid for actuation, will be designed to operate at a higher pressure, such as 100 to 120 psi. The various functions of the suspension system will then cause the hydraulic fluid to be directed through the port 18 into the outer chamber of the pressure vessel 10. This insertion of hydraulic fluid at a greater pressure will collapse the resilient bladder 36 and compress the precharged gas to a high pressure. Once the pressure is equalized in both the inner gas chamber and the outer hydraulic chamber, the system will be stabilized. The hydraulic fluid will egress from the pressure vessel 10 either by increasing the pressure within the rubber bladder 36 or by decreasing the pressure in the suspension system thereby causing the hydraulic fluid to seep out. As the hydraulic fluid leaves the outer chamber, the resilient bladder 36 again expands to its initial shape and the operation is ready to repeat itself over again.

The method of assembling the pressure vessel 10 will now be discussed. It should be remembered that the pressure vessel 10 is designed to be of a disposable type wherein the pressure vessel 10 will be disposed of rather than repaired when a failure does occur. The method of assembly comprises several steps starting with a purging of the cylindrical housing 12 so that all contaminants such as oil, dirt and foreign particles may be removed therefrom. It is particularly important that the purging process removes all foreign contaminants from the interior surface of the cylindrical housing 12 and from the annular surface at the open end 16. After the cylindrical housing 12 has been purged, a sealing means 46 such as an O-ring is positioned in the second annular groove 34. The open end 40 of the bladder 36 which contains the annular protuberant 44 is then placed in the first annular groove 32. With the sealing means 46 and the bladder 36 positioned on the end cap 20, the end cap 20 is inserted into the open end 16 of the cylindrical housing 12. In order to get complete insertion of the end cap 20 into the cylindrical housing 12, a certain amount of pressure will have to be applied until the annular shoulder 30 abuts up against the annular surface of the open end 16. The end cap 20 is then welded such as by a continuous bead welding process or other similar process to the cylindrical housing 12 approximate the annular shoulder 30. The weld should then be checked using any of a number of standard procedures. After the end cap 20 has been welded onto the cylindrical housing 12, the valve means 24 is inserted into the end cap 20 across the through hole 22. The pressure vessel 10 is now ready for attachment to a particular system or device.

While the invention has been described in conjunction with a specific embodiment it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A method of assembling a pressure vessel having a rigid cylindrical housing having a closed end and an open end, said closed end having a port provided therein; an end cap having an axially extending through hole provided therein, an annular shoulder encircling the outer periphery thereof, and first and second annular grooves encircling the outer periphery thereof, said first annular groove located between said annular shoulder and said second annular groove; a gas valve; and a generally cylindrical bladder of a resilient deformable material having a closed end and an open end, said open end having an inwardly projecting annular protuberant; said method comprising the steps of:

(a) purging said cylindrical housing to remove contaminants;

(b) positioning an O-ring in said second annular groove in said end cap;

(c) inserting said annular protuberant of said bladder into said first annular groove in said end cap;

(d) inserting said bladder and end cap into said open end of said cylindrical housing;

(e) pressing said bladder end and end cap into said open end of said cylindrical housing until said annular shoulder abuts said open end of said cylindrical housing;

(f) securely fastening by a continuous weld the exterior of the abutting shoulder of said end cap to said open end of said cylindrical housing; and (g) inserting said gas valve in a blocking position across said through hole in said end cap.

2. A method of assembling a pressure vessel having a rigid cylindrical housing having a closed end and an open end, said closed end having a port provided therein; an end cap having an axially extending through hole provided therein, an annular shouler encircling the outer periphery thereof, and first and second annular grooves provided therein which encircle the outer periphery thereof, said first annular groove located between said annular shoulder and said second annular groove; a bidirectional gas valve; and a generally cylindrical bladder of a resilient deformable material having a closed end and an open end, said open end having an inwardly projecting annular protuberant; said method comprising the steps of:

(a) purging said cylindrical housing to remove foreign contaminants;

(b) positioning an O-ring in said second annular groove in said end cap;

(c) inserting said annular protuberant of said bladder into said first annular groove in said end cap;

(d) inserting said bladder and end cap into said open end of said cylindrical housing;

(e) pressing said bladder end and end cap into said open end of said cylindrical housing until said annular shoulder abuts said open end of said cylindrical housing;

(f) securely fastening by a continuous weld the exterior of the abutting shoulder of said end cap to said open end of said cylindrical housing;

(g) inserting said bidirectional gas valve in a blocking position across said through hole in said end cap; and (h) precharging said bladder with a gas.

3. The method of claim 2 wherein said gas is nitrogen.

4. The method of claim 2 wherein said gas is precharged to about 90 psi.

* * * * *